(12) United States Patent
Vochsen et al.

(10) Patent No.: US 12,169,042 B2
(45) Date of Patent: Dec. 17, 2024

(54) METAL PIPE, IN PARTICULAR PIPE FOR CONVEYING OIL AND GAS, COMPRISING A METAL COATING IN A TRANSITION REGION

(71) Applicant: SMS GROUP GMBH, Dusseldorf (DE)

(72) Inventors: Jochen Vochsen, Erkelenz (DE); Michael Stark, Markdorf (DE)

(73) Assignee: SMS GROUP GMBH, Mönchengladbach (DE)

( * ) Notice: Subject to any disclaimer, the term of this patent is extended or adjusted under 35 U.S.C. 154(b) by 221 days.

(21) Appl. No.: 17/607,250

(22) PCT Filed: Apr. 29, 2020

(86) PCT No.: PCT/EP2020/061935
§ 371 (c)(1),
(2) Date: Oct. 28, 2021

(87) PCT Pub. No.: WO2020/221819
PCT Pub. Date: Nov. 5, 2020

(65) Prior Publication Data
US 2022/0243859 A1    Aug. 4, 2022

(30) Foreign Application Priority Data

Apr. 29, 2019  (DE) .................. 102019206093.5

(51) Int. Cl.
*F16L 58/18*  (2006.01)
*B23K 9/028*  (2006.01)
(Continued)

(52) U.S. Cl.
CPC ......... *F16L 58/181* (2013.01); *F16L 13/0263* (2013.01); *F16L 58/1027* (2013.01);
(Continued)

(58) Field of Classification Search
CPC ...... F16L 58/181; F16L 58/08; F16L 13/0263
See application file for complete search history.

(56) References Cited

U.S. PATENT DOCUMENTS 3,289,293 A * 12/1966 Stenquist ............... B23K 35/26
3,735,478 A *  5/1973 Porter ..................... F16L 58/08
(Continued)

FOREIGN PATENT DOCUMENTS

AU      2010326379      6/2012
CN      1110385         10/1995
(Continued)

OTHER PUBLICATIONS

Chinese Office Action for corresponding Chinese Patent Application No. 202080032012.6 dated Mar. 31, 2023, 8 pages.
(Continued)

*Primary Examiner* — Zachary T Dragicevich
(74) *Attorney, Agent, or Firm* — Lee & Hayes, P.C.

(57) ABSTRACT

A metal pipe and a system of pipes, and a method of producing the same. The pipe is for conveying oil and gas. The pipe includes a metal coating in a transition region. The metal coating of the transition region obviates a subsequent coating of the inner surface of the transition region after connecting two pipes using a welding process in order to form a pipeline.

8 Claims, 2 Drawing Sheets

(51) Int. Cl.
  *B23K 101/10* (2006.01)
  *F16L 13/02* (2006.01)
  *F16L 58/08* (2006.01)
  *F16L 58/10* (2006.01)

(52) U.S. Cl.
  CPC ........ *B23K 9/0282* (2013.01); *B23K 2101/10* (2018.08); *F16L 13/0272* (2013.01); *F16L 58/08* (2013.01)

(56) References Cited

U.S. PATENT DOCUMENTS

| | | | |
|---|---|---|---|
| 4,132,343 A | | 1/1979 | Kullendorff |
| 4,606,378 A | * | 8/1986 | Meyer .................... F16L 58/08 |
| 4,611,833 A | | 9/1986 | Lescaut |
| 4,780,072 A | * | 10/1988 | Burnette ............... F16L 58/181 |
| 4,883,292 A | * | 11/1989 | Kuroki ................. F16L 58/181 |
| 5,009,737 A | * | 4/1991 | Lescaut ................ F16L 58/181 |
| 5,104,152 A | * | 4/1992 | Galfant ................ F16L 58/181 |
| 6,238,806 B1 | * | 5/2001 | Sakuraba ............... F16L 58/08 |
| 2005/0166987 A1 | * | 8/2005 | Matsubara ............. F16L 58/08 |
| 2013/0136540 A1 | | 5/2013 | Jones et al. |
| 2014/0042740 A1 | | 2/2014 | Barrett |
| 2016/0312930 A1 | | 10/2016 | Safari et al. |

FOREIGN PATENT DOCUMENTS

| | | |
|---|---|---|
| CN | 202419038 | 9/2012 |
| CN | 103008988 | 4/2013 |
| CN | 106270933 | 1/2017 |
| CN | 106641497 | 5/2017 |
| CN | 206973094 | 2/2018 |
| CN | 207906641 | 9/2018 |
| DE | 2704490 | 9/1977 |
| RU | 2197676 | 1/2003 |
| SU | 372403 | 12/1974 |
| WO | WO2013108036 | 7/2013 |

OTHER PUBLICATIONS

PCT Search Report for corresponding PCT Application No. PCT/EP2020/061935 dated Aug. 7, 2020, 13 pages.
Russian Office Action from corresponding RU Patent Application No. 2021134635, dated Jun. 22, 2023, 6 pages.
Zhou, Changchun; "University Chemistry."
EP Office Action from corresponding EP Patent Application No. 20724022.7 dated Feb. 14, 2022, 5 pages.

* cited by examiner

METAL PIPE, IN PARTICULAR PIPE FOR CONVEYING OIL AND GAS, COMPRISING A METAL COATING IN A TRANSITION REGION

This application claims priority to PCT Application No. PCT/EP2020/061935, filed Apr. 29, 2020, which claims priority to DE Patent Application No. 102019206093.5, filed Apr. 29, 2019, the contents of each of which is incorporated herein by reference.

TECHNOLOGICAL FIELD

This disclosure describes a metal pipe, in particular a pipe for conveying oil and gas, comprising a metal coating in a transition region. This disclosure also describes a system of such pipes, and a method for producing the pipe and the system of pipes.

BACKGROUND

Metal pipes, in particular pipes for conveying oil and gas, are welded together at the pipe joints during the laying process thereof. To prevent corrosion or abrasion on the inner surface of the pipe body by the oil or gas or their components, these are typically coated on the inner surfaces with a base coating made of plastics material or a metal material. Due to the influence of heat when welding together two metal pipes, this base coating can completely or partially peel off or become perforated in the region of the heat-affected zone. As a result, this region is no longer protected against corrosion or abrasion.

If the pipe diameter is sufficiently large, these regions can be given this base coating again subsequently. However, this reduces the pipe laying speed and causes system costs and/or material costs. In the case of small pipe diameters, the wear at these points is taken into account when designing the material thickness and service life and results in correspondingly higher unit costs or a shorter service life.

SUMMARY

This disclosure describes a metal pipe coated on the inner surface in such a way that a continuous wear-inhibiting layer is retained in a welded connection between two such pipes without a subsequent coating.

The transition region of a metal pipe, in particular a pipe made of a steel material, is coated on the inner surface of the pipe body with a, preferably weldable, metal material with anti-corrosion and/or anti-abrasion properties. The at least partial base coating on the inside of the pipe body at least partially covers the metal coating of the transition region. The transition region is arranged at the joint of the metal pipe and covers the heat-affected zone of a possible weld seam and an additional region of the pipe body to such an extent that the heat introduced using a welding process when connecting two pipes no longer can harm the base coating of the pipe body or the base coating of the metal coating. As a result, a continuous protective layer is retained on the inner surface of the pipe even in the case of a welded connection without additional work.

The metal coating of the transition region preferably consists of a metal material, preferably of a weldable, stainless steel material, preferably of the material 2.4856; in particular weldable metal materials can be easily applied to a conventional steel pipe. Stainless materials used as a coating are, for example, very resistant to chemical attacks from oils or gases, some of which contain sulfuric acid.

Ideally, the metal coating has a variable thickness in the transition region, preferably a thickness that increases toward the pipe joint. From a fluid-technical point of view, it is preferred if no edges remain on the inner surface of the pipe after coating. These edges can be reduced through variable layer thicknesses.

In the transition region, the metal coating has an average thickness of 0.1 mm to 2 mm, preferably an average thickness of 0.1 mm to 1 mm, even more preferably an average thickness of 0.2 mm to 0.4 mm. In the range of these thicknesses, there is an optimum between the material used for the coating and the protective effect with a normal service life of a pipe in use.

The pipe joint preferably has a coating that is at least partially made of metal; preferably, the pipe joint made of the same material as the coating of the transition region. In this way, the pipe joint can be effectively protected from wear. Gripping the pipe joint with an ideally continuous metal coating improves the connection between the pipe material and the metal coating.

The metal coating of the pipe joint has a variable thickness. In this way, conceivable toothings, surface courses, which were previously formed by the pipe joint itself, can also be formed by a coated pipe joint.

The metal coating of the pipe joint has an average thickness of 0.1 mm to 5 mm, preferably an average thickness of 0.1 mm to 1 mm, even more preferably an average thickness of 0.2 mm to 0.4 mm. These thicknesses represent an optimum between the desired protective effect and the use of materials.

The length of the pipe body is preferably greater than 10 m. As of this length, subsequent coating of a pipe connection is usually no longer possible or economical. Furthermore, the pipe body preferably has an inner diameter of more than 150 mm, preferably of more than 250 mm. These diameters are preferred in pipeline construction. In this application, in particular the wear resistance is of particular importance and the pipe laying speed dominates the investment costs. Both are improved by an embodiment of a metal pipe according to the invention.

Ideally, one edge of the metal coating of the transition region and/or the pipe joint is chamfered. This means that the edge no longer needs to be prepared prior to a welding process. The chamfer on the edge of the metal coating preferably forms part of a V or J groove. These grooves are common shapes when joining two pipes using a welding process. The chamfer can also be protected from corrosion with a thermally unstable coating, so that there is no need to grind the chamfer prior to a welding process. This reduces the work steps involved in producing a pipeline on a construction site.

A system of at least two metal pipes are connected to one another by a weld seam and have a continuous coating with anti-corrosion and/or anti-abrasion properties on the inner surface. Such a system allows for long pipelines with a continuous wear-inhibiting protective layer on the inner surface of the pipeline. The welding process is an established method, in particular in pipeline construction, for connecting individual pipes to form a pipeline.

The metal pipes are preferably welded to one another by a weld seam made from the metal coating material. The protective layer on the inside is retained in particular when a connection is made with a welding process on the inner and outer surface or edge of the pipe joint.

The disclosure further describes a method for producing a metal pipe. The transition region of the pipe is coated with a metal material with anti-corrosion and/or anti-abrasion properties by means of build-up welding, and a base coating, preferably a non-metal coating, is then applied to the inner surface of the pipe, the base coating being the inner surface of the pipe body and partly covering the metal coating of the transition region. In the sense of the invention, build-up welding comprises the methods plasma spraying, laser build-up welding, or also the application of a layer using an arc welding method.

A metal material, more preferably a weldable, stainless material, most preferably the material 2.4856 (commonly known as Iconel 6245, which is a nickel-based alloy), is preferably used for the metal coating of the transition region. Metal materials, in particular weldable metal materials, can be easily applied to a conventional steel pipe. Stainless materials used as a coating are very resistant to chemical attacks, for example, from oils or gases, some of which contain sulfuric acid.

Ideally, a metal coating is applied in the transition region with a variable thickness, preferably with a thickness that increases toward the pipe joint. By applying with the thickness of the metal coating that increases toward the pipe joint, a continuous coating without edges can be produced with the subsequent coating. This reduces the pressure loss in the pipe when oil or gas is passed through.

The metal coating in the transition region is preferably applied with an average thickness of 0.1 mm to 2 mm, preferably with an average thickness of 0.1 mm to 1 mm, even more preferably with an average thickness of 0.2 mm to 0.4 mm. These layer thicknesses can be applied reliably using known methods and represent an optimum between use of materials and wear protection.

At least partially, the pipe joint is preferably coated with a metal coating, preferably with the same material as the coating of the transition region. A, preferably continuous, coating of the transition region and the pipe joint improves the adhesion of the metal coating and improves the properties of use during the installation and operation of the pipe.

A metal coating having a variable thickness is applied to the pipe joint. As a result, the design-related surface contours are retained or can be generated. This simplifies handling when assembling the pipeline.

The metal coating of the pipe joint is applied with an average thickness of 0.1 mm to 2 mm, preferably with an average thickness of 0.1 mm to 1 mm, even more preferably with an average thickness of 0.2 mm to 0.4 mm. These thicknesses represent an optimum between material consumption during the coating and the desired wear protection.

It is preferred to use pipe bodies with a length greater than 10 m and/or with an inner diameter of more than 150 mm, more preferably of more than 250 mm. Above these limit dimensions, subsequent coating of the inner surface is usually uneconomical.

An edge of the metal coating of the transition region and/or the pipe joint, preferably in the region of a weld seam, is chamfered, with part of a V or J groove ideally being chamfered into the edge. This reduces the number of steps required to produce a pipeline on the construction site. Part of the preparatory work is not necessary because the weld seams are usually placed in V or J grooves when connecting two pipes.

A build-up weld is preferably applied in the form of a ring in the as yet uncoated pipe at the pipe ends on the inside, preferably in a recess in the pipe body, and the build-up weld has anti-corrosion and/or anti-abrasion properties. The pipe is then provided with a base coating material from the inside, with part of the build-up weld also being provided with the base coating in an overlapping manner.

Furthermore, a method includes welding pipe joints together, preferably with the material of the metal coating.

DETAILED DESCRIPTION OF THE DRAWINGS

The figures in the form of embodiments are described in detail below. In all figures, the same technical elements are denoted by the same reference signs.

Figure 1:
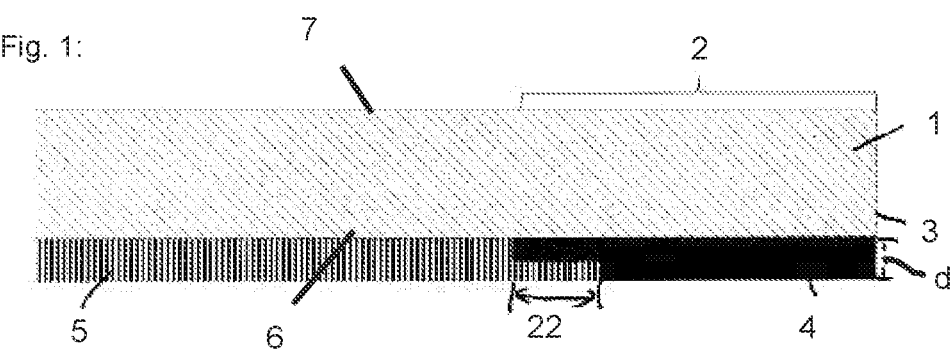
FIG. 1: Section through pipe with coating

FIG. 1 shows a section through a metal pipe according to the invention for the passage of oil or gas. The pipe body 1 consists for example of a carbon steel and forms the structure of the metal pipe. A transition region 2, which is provided with a metal coating 4, is arranged at the end of the pipe body 1. The metal coating 4 has a thickness d that increases toward the pipe joint 3. A base coating 5, in this case for example a plastics material layer, is applied to the inner surface 6 of the pipe body 1, the plastics material layer 5 partially covering the metal coating 4. The offset in the metal coating 4 allows for an almost edge-free inner surface 6 of the entire pipe.

Figure 2:
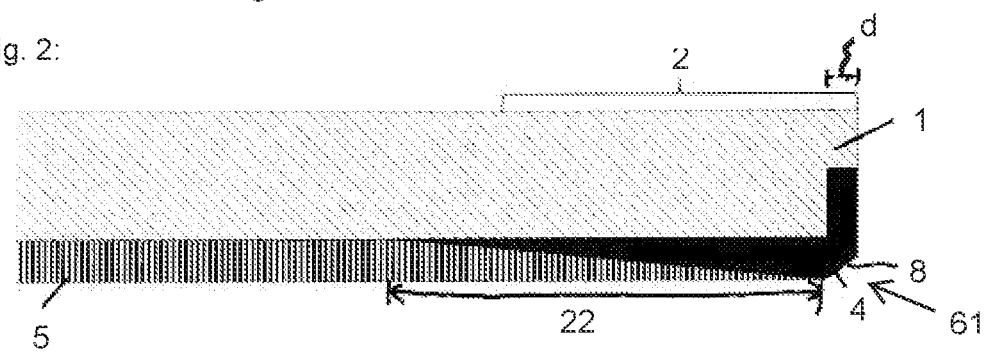
FIG. 2: Section through pipe with coating of the pipe joint

FIG. 2 shows a section through a pipe with a metal coating 4 of the transition region 2 and an additional metal coating 4 of the pipe joint 3. The metal coating 4 is designed continuously so that an L-shape results in the sectional view. In the transition region 2, the metal coating 4 is designed to rise continuously to the pipe joint 3. The pipe joint 3 is coated with a constant thickness d. The inner edge 61 of the metal coating 4 is chamfered accordingly to form a partial V groove 8 (or J groove).

Figure 3:
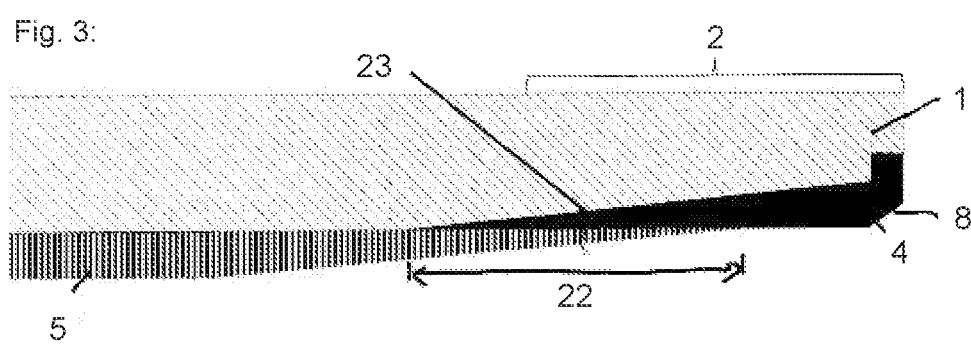
FIG. 3: Section through pipe with coating in a recess

FIG. 3 shows a section through a pipe with a metal coating 4 of the transition region 2 in a recess 23 of the pipe body 1 and an additional metal coating 4 of the pipe joint 3. The metal coating 4 of the pipe joint and transition region 2 is designed to be continuous, so that an L-shape results in the sectional view. In the transition region 2, the base coating 5, in this case for example a sprayed-on metal coating, partially covers the metal coating.

Figure 4:
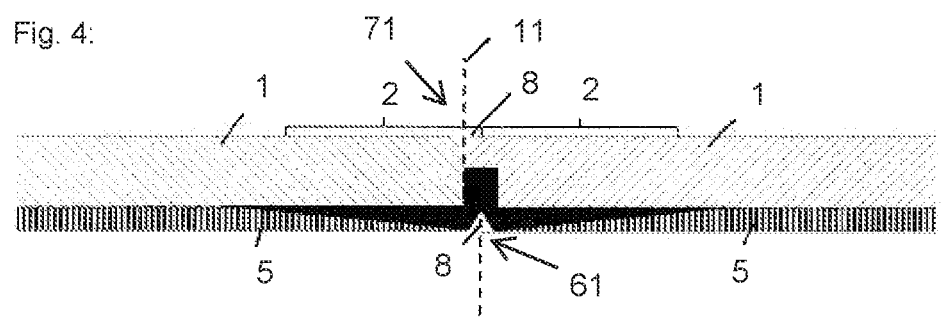
FIG. 4: Section through two connected pipes without a weld

FIG. 4 shows a section through two pipes according to the invention arranged next to one another. The two pipe joints 3 are in contact with one another, so that a continuous coating is formed. The chamfered edges of the metal coating 4 form a V groove on the inner and outer edges 61, 71. Furthermore, the mutually adjacent pipe joints 3 each have a complementary groove and spring connection 11, one part being coated or formed by the metal coating 4 of the pipe joint 3.

Figure 5:
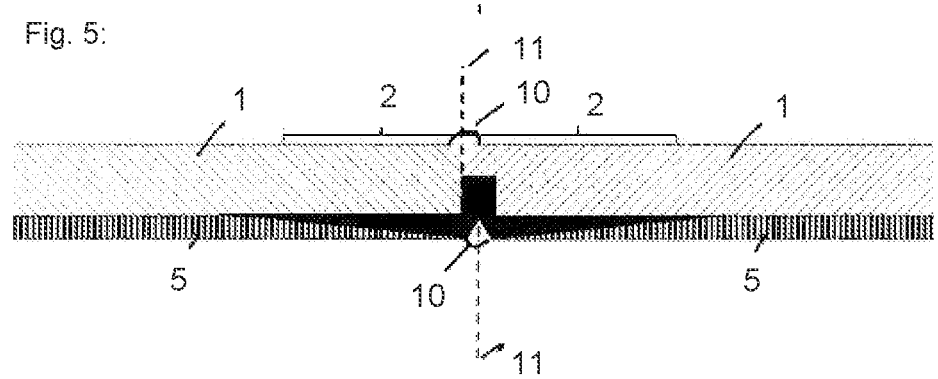
FIG. 5: Section through two connected pipes with a weld seam

FIG. 5 shows the section from FIG. 3 with a corresponding weld seam 10 in the two V grooves 8 on the inner and outer edge 61, 71 for connecting the two pipes to form a pipeline.

TABLE 1

| Reference signs | |
|---|---|
| Number | Description |
| 1 | Pipe body |
| 2 | Transition region (Heat-affected zone) |
| 22 | Coverage region |
| 23 | Recess |
| 3 | Pipe joint |
| 4 | Metal coating |
| 5 | Base coating |
| 6 | Inner surface |
| 61 | Inner edge |
| 7 | Outer surface |
| 71 | Outer edge |
| 8 | Part V (or J) groove |
| 10 | Weld seam |
| 11 | Groove and spring pipe body |
| d | Thickness |

The invention claimed is:

1. A metal pipe for conveying oil and gas, the metal pipe comprising:
a pipe body with an inner surface and an outer surface; and
a pipe joint having a transition region located at an end of the pipe body, and the inner surface of the pipe body having at least a partial base coating disposed at the transition region,
wherein the transition region is coated on the inner surface of the pipe body with a weldable metal coating of a material with anti-corrosion and/or anti-abrasion properties,
wherein the at least partial base coating on the inner surface of the pipe body partially covers the metal coating of the transition region, and
wherein the at least partial base coating is a sprayed-on metal base coating.

2. The metal pipe according to claim 1, wherein the metal coating of the transition region consists of a nickel-based steel alloy.

3. The metal pipe according to claim 1, wherein the metal coating has a variable thickness in the transition region, such that the thickness increases toward the pipe joint.

4. The metal pipe according to claim 1, wherein the metal coating in the transition region has an average thickness of 0.1 mm to 2 mm.

5. The metal pipe according to claim 1, wherein a length of the pipe body is greater than 10 m.

6. The metal pipe according to claim 1, wherein the pipe body has an inner diameter of more than 150 mm.

7. A system comprising:
at least two metal pipes, each of the at least two metal pipes including:
a pipe body with an inner surface and an outer surface, and
a pipe joint having a transition region located at an end of the pipe body, and the inner surface of the pipe body having at least a partial base coating disposed at the transition region,
wherein:
the transition region is coated on the inner surface of the pipe body with a weldable metal coating of a material with anti-corrosion and/or anti-abrasion properties,
the at least partial base coating on the inner surface of the pipe body partially covers the metal coating of the transition region,
the at least partial base coating is a sprayed-on metal base coating; and
wherein:
the at least two metal pipes are connected to one another by a weld seam at the respective pipe joints, and
the at least two pipes have a continuous coating of the at least partial base coating and the metal coating on the inner surface therebetween.

8. The system according to claim 7, wherein the weld seam is made from the material of the metal coating.

* * * * *